(12) United States Patent
Iwayama et al.

(10) Patent No.: US 11,222,180 B2
(45) Date of Patent: Jan. 11, 2022

(54) DIALOGUE METHOD, DIALOGUE SYSTEM, AND PROGRAM

(71) Applicant: Hitachi, Ltd., Tokyo (JP)

(72) Inventors: Makoto Iwayama, Tokyo (JP); Yu Asano, Tokyo (JP)

(73) Assignee: HITACHI, LTD., Tokyo (JP)

( * ) Notice: Subject to any disclaimer, the term of this patent is extended or adjusted under 35 U.S.C. 154(b) by 261 days.

(21) Appl. No.: 16/516,284

(22) Filed: Jul. 19, 2019

(65) Prior Publication Data

US 2020/0050670 A1 Feb. 13, 2020

(30) Foreign Application Priority Data

Aug. 13, 2018 (JP) .............................. JP2018-152273

(51) Int. Cl.
*G06F 40/30* (2020.01)
*G06F 40/253* (2020.01)

(52) U.S. Cl.
CPC ............ *G06F 40/30* (2020.01); *G06F 40/253* (2020.01)

(58) Field of Classification Search
CPC ..................................................... G06F 40/30
See application file for complete search history.

(56) References Cited

U.S. PATENT DOCUMENTS 8,898,148 B1 * 11/2014 Yagnik ................ G06F 16/9535
707/721
10,453,117 B1 * 10/2019 Reavely ............. G06Q 30/0645
2004/0189697 A1 9/2004 Fukuoka et al.

FOREIGN PATENT DOCUMENTS

JP 2004-288018 A 10/2014

\* cited by examiner

*Primary Examiner* — Kevin Ky
(74) *Attorney, Agent, or Firm* — Mattingly & Malur, PC (57) ABSTRACT

Provided is a technique for easily using a dialogue service that reduces an effect of a change in a task of the dialogue service and provides a plurality of tasks. In the dialogue method, a computer including a processor and a memory executes a dialogue. The dialogue method includes: a text input step in which the computer receives text; a task execution step in which the computer causes the text to be separately executed by a plurality of types of tasks; an execution result obtaining step in which the computer separately obtains execution results from the plurality of types of tasks; a task selection step in which the computer selects one of the obtained execution results; and a response output step in which the computer outputs the selected execution result as an answer to the text.

5 Claims, 8 Drawing Sheets

| TRANSITION SOURCE/TRANSITION DESTINATION | QUESTION-AND-ANSWER TASK | SCENARIO TASK |
|---|---|---|
| QUESTION-AND-ANSWER TASK | 0.6 | 0.5 |
| SCENARIO TASK | 0.5 | 0.8 |

351  352

35
MODE TRANSITION WEIGHTING DATA

FIG. 8

DIALOGUE METHOD, DIALOGUE SYSTEM, AND PROGRAM

INCORPORATION BY REFERENCE

This application claims priority based on Japanese patent application, No. 2018-152273 filed on Aug. 13, 2018, the entire contents of which are incorporated herein by reference.

BACKGROUND

The present disclosure relates to a dialogue system using a natural language.

With progress in machine learning and improvement in processing capabilities of computers and networks, a dialogue service using a natural language is becoming widespread. As the dialogue service, there has been a task of receiving voice and text for each category of dialogue such as "weather forecast" or "transfer guidance" and outputting a corresponding response.

For example, JP-A-2004-288018 has been known as a technique of using a dialogue service that provides a different task for each category (or genre) of dialogue, such as the above-described dialogue service. JP-A-2004-288018 discloses a technique of querying a plurality of dialogue agents (tasks) about processable information and matching input information and the processable information, selecting a dialogue agent capable of processing the input information, and transmitting the input information to the selected dialogue agent to receive a response.

SUMMARY

However, in the above-described example in the related art, in order to select a task, it is necessary to generate models and rules in advance. When the type or content of the task is changed (for example, the content is increased), it is necessary to re-create all models and rules.

In the above-described example in the related art, when a task is selected, it is necessary to generate processing of selecting the task in accordance with input context. When the type or content of the task is changed, it is necessary to correct the processing of selecting the task in accordance with the context.

The invention is made in view of the above problems, and an object of the invention is to provide a technique for easily using a dialogue service that reduces an effect of a change in a task of the dialogue service and provides a plurality of dialogue agents executing tasks.

The invention provides a dialogue method in which a computer executes a dialogue, the computer including a processor and a memory. The dialogue method includes: a text input step in which the computer receives text; a task execution step in which the computer causes the text to be separately executed by a plurality of agents executing tasks; an execution result obtaining step in which the computer separately obtains execution results from the plurality of executed tasks; a task selection step in which the computer selects one of the obtained execution results; and a response output step in which the computer outputs the selected execution result as an answer to the text.

Therefore, even when any one of a plurality of agents executing tasks is changed in the invention, use of a dialogue service can be continued without modifying models or rules.

The details of one or more implementations of the subject matter described in the specification are set forth in the accompanying drawings and the description below. Other features, aspects, and advantages of the subject matter will become apparent from the description, the drawings, and the claims.

DESCRIPTION OF THE EMBODIMENTS

Embodiments of the invention will be described below with reference to the accompanying drawings.

First Embodiment

Figure 1:
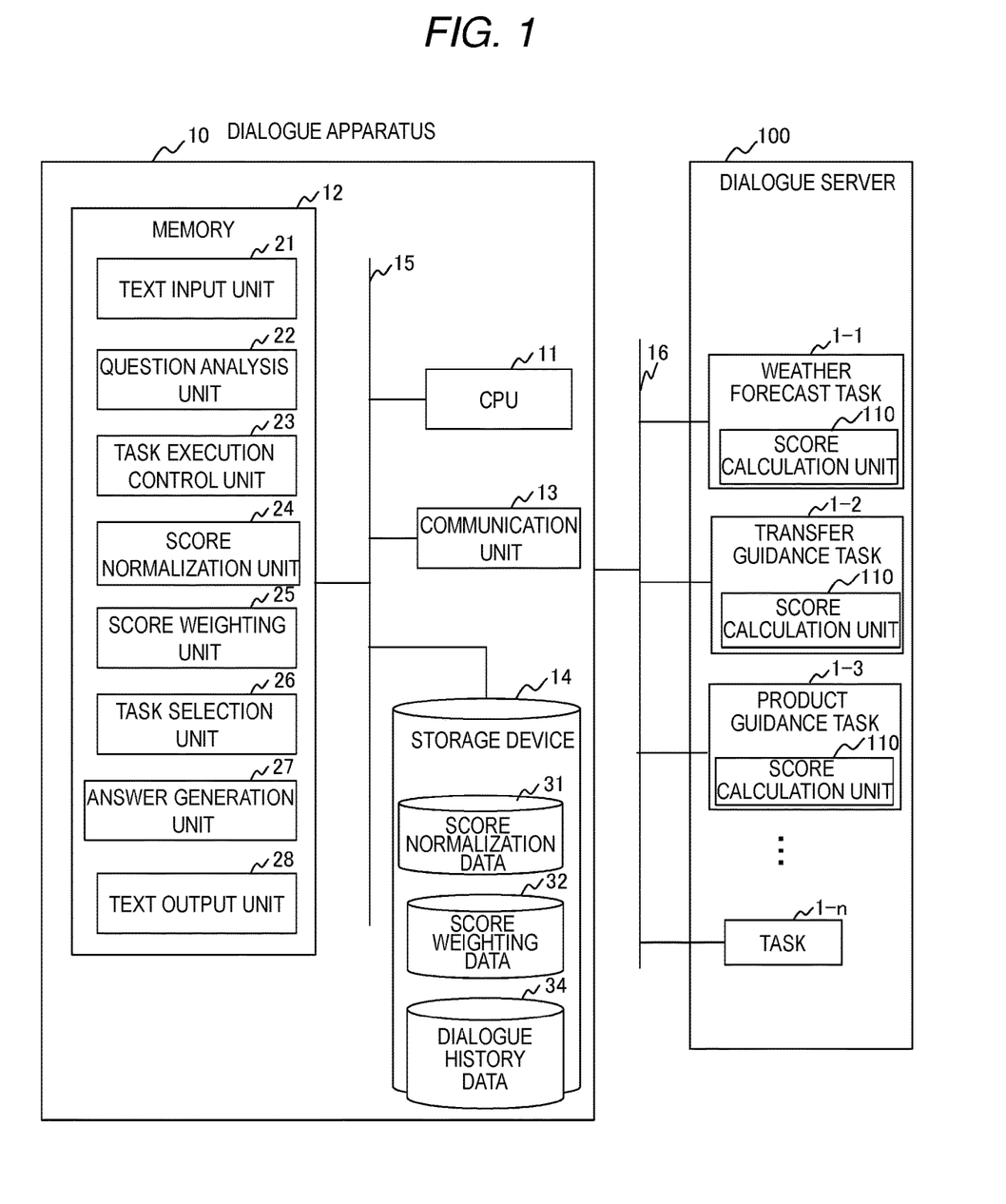
FIG. 1 is a block diagram showing an example of a dialogue system according to a first embodiment.

FIG. 1 is a block diagram showing an example of a dialogue system according to a first embodiment of the invention. The dialogue system includes a dialogue apparatus 10 that performs inputs and outputs with a user (customer), and a dialogue server 100 connected to the dialogue apparatus 10 via a network 16 to provide a plurality of dialogue agents executing tasks (1-1 to 1-n), and hereinafter referred to as tasks.

The dialogue apparatus 10 receives an input (text or speech) from the user, and causes each task to separately calculate a response to the input to the dialogue server 100. Examples of tasks provided by the dialogue server 100 include a weather forecast task 1-1 of generating a response to a query about a weather forecast of each region, a transfer guidance task 1-2 of generating a response to a query about a usage path and time of a transportation facility, and a product guidance task 1-3 of generating a response to a query about a product to be purchased.

In the following description, when an individual task is not specified, a mark "1" is used in which "-" and content thereafter are omitted. The tasks provided by the dialogue server 100 are not limited to the above, and can be tasks of generating responses to various queries such as map information or event information. Each task 1 may be separately provided by an independent server.

The dialogue server 100 includes score calculation units 110 that calculate scores (certainty factors) for responses calculated for the tasks 1. The score calculation units 110 calculate certainty factors of responses to inputs of the tasks 1 as the scores, add the scores to the responses, and output the responses.

The dialogue apparatus 10 selects a response having a maximum score added to the response from the responses of the tasks 1 received from the dialogue servers 100 as an optimal response, and outputs the response having the maximum score to the user.

The dialogue apparatus 10 is a computer including a CPU 11, a memory 12, a communication unit 13, a storage device 14, and an interconnect 15. The CPU 11 executes programs loaded into the memory 12.

The memory 12 shows an example in which a text input unit 21, a question analysis unit 22, a task execution control unit 23, a score normalization unit 24, a score weighting unit 25, a task selection unit 26, an answer generation unit 27, and a text output unit 28 are loaded as programs.

The CPU 11 operates as a functional unit that provides a predetermined function by performing processing in accordance with a program of each functional unit. For example, the CPU 11 functions as the text input unit 21 by performing processing in accordance with a text input program. The same applies to other programs. The CPU 11 also operates as a functional unit that provides respective functions of a plurality of pieces of processing executed by the programs. The computer and a computer system are an apparatus and a system that include these functional units.

Programs that realize functions of the dialogue apparatus 10 and information such as tables can be stored in a memory device such as the storage device 14, a nonvolatile semiconductor memory, a hard disk drive, and a solid state drive (SSD), or in a computer readable non-transitory data memory medium such as an IC card, an SD card, and a DVD.

The text input unit 21 receives text from a terminal or a computer used by the user and outputs the text to the question analysis unit 22. When an utterance is received from the user, a microphone (not shown) is provided on the dialogue apparatus 10, and the text is extracted by a voice recognition unit (not shown).

The question analysis unit 22 analyzes and optimizes text to be input to the tasks 1 and outputs the optimized text to the task execution control unit 23. The optimization can be omission of unnecessary words or the like. Alternatively, the received text may be directly output to the task execution control unit 23.

The task execution control unit 23 inputs the text received from the text input unit 21 to all the tasks 1 provided by the dialogue server 100 and causes the tasks 1 to calculate responses and scores. Then, the task execution control unit 23 receives the responses and the scores from all the tasks 1 of the dialogue server 100, and outputs the responses and the scores to the score normalization unit 24 or the task selection unit 26.

The score normalization unit 24 normalizes the scores received from the task execution control unit 23 and outputs the normalized scores to the task selection unit 26 or the score weighting unit 25. The score weighting unit 25 corrects the scores based on weightings of the tasks 1 or the like and outputs the corrected scores to the task selection unit 26.

The task selection unit 26 selects a response having a maximum score from the responses and the scores received from the task execution control unit 23 (or the score normalization unit 24 or the score weighting unit 25), and outputs the response having the maximum score to the answer generation unit 27 as a response to the input.

The answer generation unit 27 has a scenario mode in which a dialogue is performed based on a preset scenario table (not shown), and a question-and-answer mode of responding to a query. The answer generation unit 27 can switch the modes as appropriate to perform the dialogue.

The answer generation unit 27 generates a response to the user from the response received from the task selection unit 26 in accordance with control of the scenario mode or the question-and-answer mode, and outputs the generated response to the text output unit 28. It should be noted that a well-known or publicly known dialogue technique may be applied to the scenario mode or the question-and-answer mode. Therefore, the scenario mode or the question-and-answer mode is not described in detail in the first embodiment.

The text output unit 28 converts the response to the user into text and transmits the text to the terminal or the like used by the user. Alternatively, when the utterance of the user is input, a voice synthesis unit (not shown) converts the text into voice and causes the voice to be output from the speaker (not shown).

The communication unit 13 is connected to the network to communicate with the dialogue server 100 or the terminal of the user.

The storage device 14 stores data used by the above-described functional units. Examples of the data include score normalization data 31, score weighting data 32, dialogue history data 34 and the like.

The tasks 1 provided by the dialogue server 100 can be configured with a well-known or publicly known service. Each task 1 includes the score calculation unit 110, which calculates a plurality of answer candidates for the input (query) received from the dialogue apparatus 10, applies bases of the answer candidates to a prediction model, and calculates a certainty factor. It should be noted that a well-known or publicly known technique may be applied to the calculation of the certainty factor. Therefore, a description thereof is omitted in the first embodiment. The score calculation unit 110 is not limited to calculating the certainty factor, and may calculate, for example, a numerical value representing likelihood of a response corresponding to the input (text).

Figure 2:
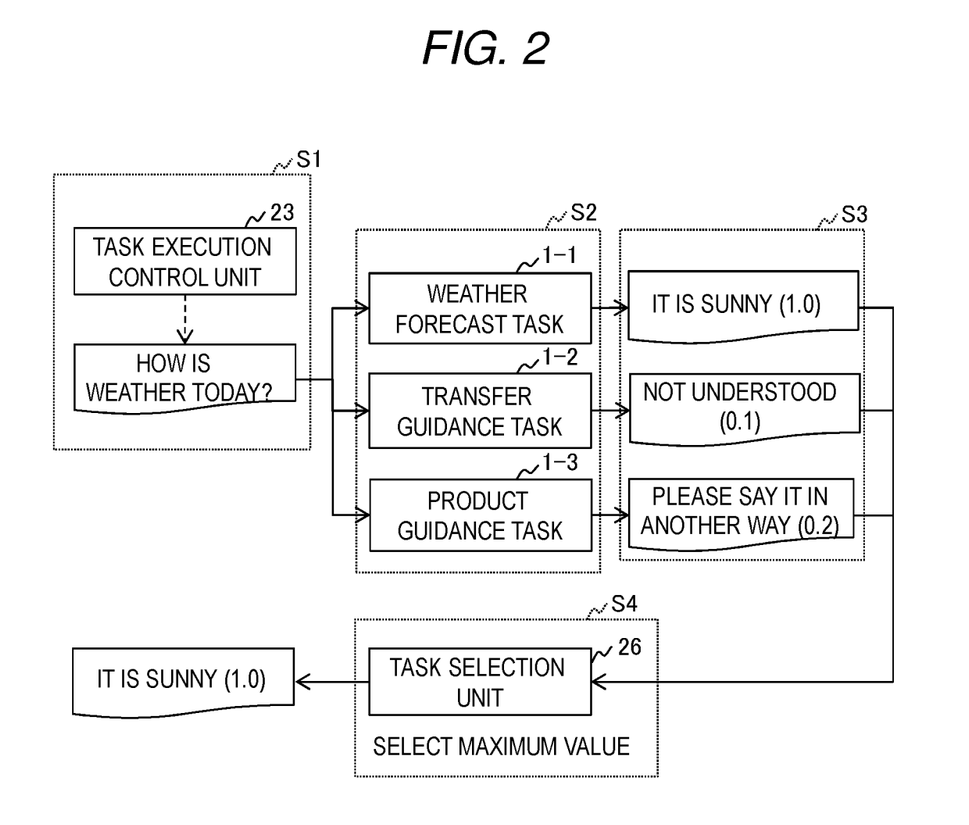
FIG. 2 shows an outline of processing performed by the dialogue system according to the first embodiment.

FIG. 2 shows an outline of processing performed by the dialogue system. The text input unit 21 of the dialogue apparatus 10 receives a query of "How is the weather today?" from the user in text and outputs the query as input text to the task execution control unit 23.

The task execution control unit 23 inputs the received input text to all the tasks 1 provided by the dialogue server 100 and requests calculation of responses and scores therefrom (S1). In the first embodiment, the task execution control unit 23 separately transmits the input text of "How is the weather today?" to the weather forecast task 1-1, the transfer guidance task 1-2, and the product guidance task 1-3, and respectively requests responses and scores therefrom (S2).

Each task 1 of the dialogue server 100 calculates a response to the input text. The score calculation unit 110 of each task 1 calculates a certainty factor of the response to the input text. Each task 1 of the dialogue server 100 transmits the calculated response and score to the dialogue apparatus 10 (S3).

The task execution control unit 23 of the dialogue apparatus 10 separately receives the response and score from each task 1 and outputs the response and score to the task selection unit 26. When receiving the responses and scores from all the tasks 1, the task selection unit 26 selects a response having a maximum score as an optimal response to the input text.

In the shown example, a response of "It is sunny" calculated by the weather forecast task 1-1 has a maximum score=1.0. Therefore, the task execution control unit 23 selects "It is sunny" as an optimal response (answer) to the input text "How is the weather today?", and outputs the optimal response to the answer generation unit 27.

The answer generation unit 27 generates the response selected by the task execution control unit 23 as a sentence corresponding to the input text, and transmits the sentence to the text output unit 28. The text output unit 28 converts the received sentence into text and responds to the terminal of the user. When the response is performed by voice, the text output unit 28 converts the text into voice by the voice synthesis unit (not shown) and causes the voice to be output from the speaker.

Figure 3:
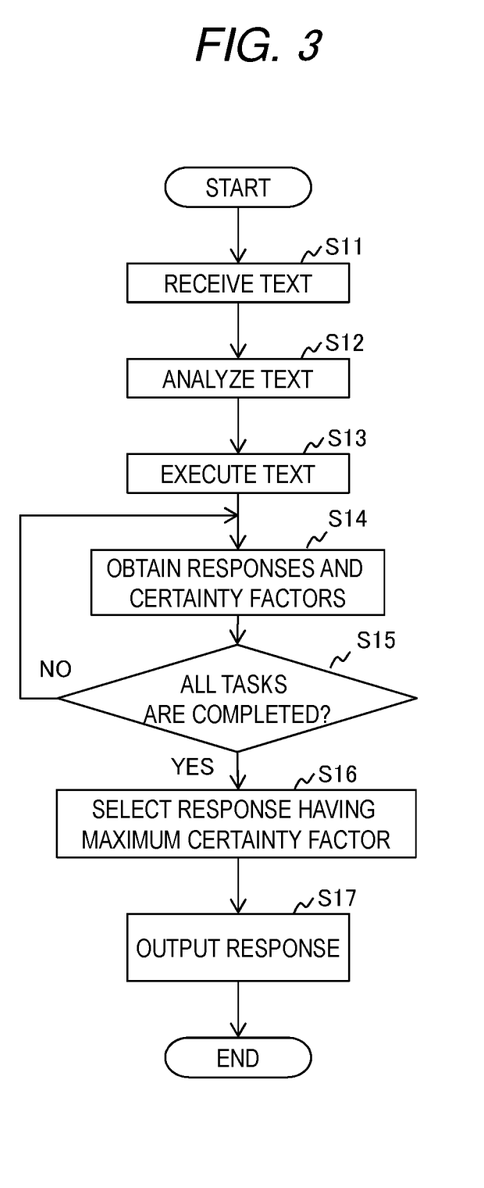
FIG. 3 is a flowchart showing an example of processing performed by a dialogue apparatus according to the first embodiment.

FIG. 3 is a flowchart showing an example of processing performed by the dialogue apparatus 10. The flowchart is executed when the dialogue apparatus 10 receives text (or an utterance).

First, the text input unit 21 receives the text such as a query from the terminal of the user (S11). When receiving an utterance of the user, the text input unit 21 converts the utterance into text using the voice recognition unit and sets the text as an input text.

Next, the question analysis unit 22 analyzes and optimizes the received text, which is to be put into the tasks 1, and outputs the optimized text to the task execution control unit 23 (S12). As described above, the received text may be directly output to the task execution control unit 23.

The task execution control unit 23 inputs the received text to all the tasks 1 of the dialogue server 100 and requests calculation of responses and scores (certainty factors) (S13). The task execution control unit 23 obtains the responses and scores (certainty factor) calculated in the tasks 1 (S14).

When the responses and scores from all the tasks 1 are obtained by the task execution control unit 23 (S15), the task election unit 26 selects a response ("It is sunny") corresponding to a maximum score (1.0) from the obtained scores and outputs the response to the answer generation unit 27 (S16). The answer generation unit 27 generates a response sentence for the input text based on the response obtained from the tasks 1. The text output unit 28 outputs the generated response sentence as text (S17).

As described above, in the first embodiment, the dialogue apparatus 10 puts the text into all the tasks 1 without selecting the task 1 into which the input text is put. In each task 1, the score calculation unit 110 calculates the certainty factor of the calculated response, sets the response and the certainty factor as a pair, and transmits the pair to the dialogue apparatus 10. In the dialogue apparatus 10, the response having the maximum certainty factor is selected as an optimal answer and is output to the terminal of the user.

The dialogue apparatus 10 according to the first embodiment only needs to put the input text into all the tasks 1, and it is not necessary to generate models or rules to select the task 1 as in the example in the related art. Therefore, even when there is a change in the tasks 1, operation cost of the dialogue system can be reduced because it is not necessary to modify the models or rules.

When the number of tasks 1 provided by the dialogue server 100 increases or decreases, the task execution control unit 23 only increases or decreases the number of tasks 1 to which the text is input. Therefore, maintenance can be easy even when the number of tasks 1 provided by the dialogue server 100 increases or decreases.

Figure 4:
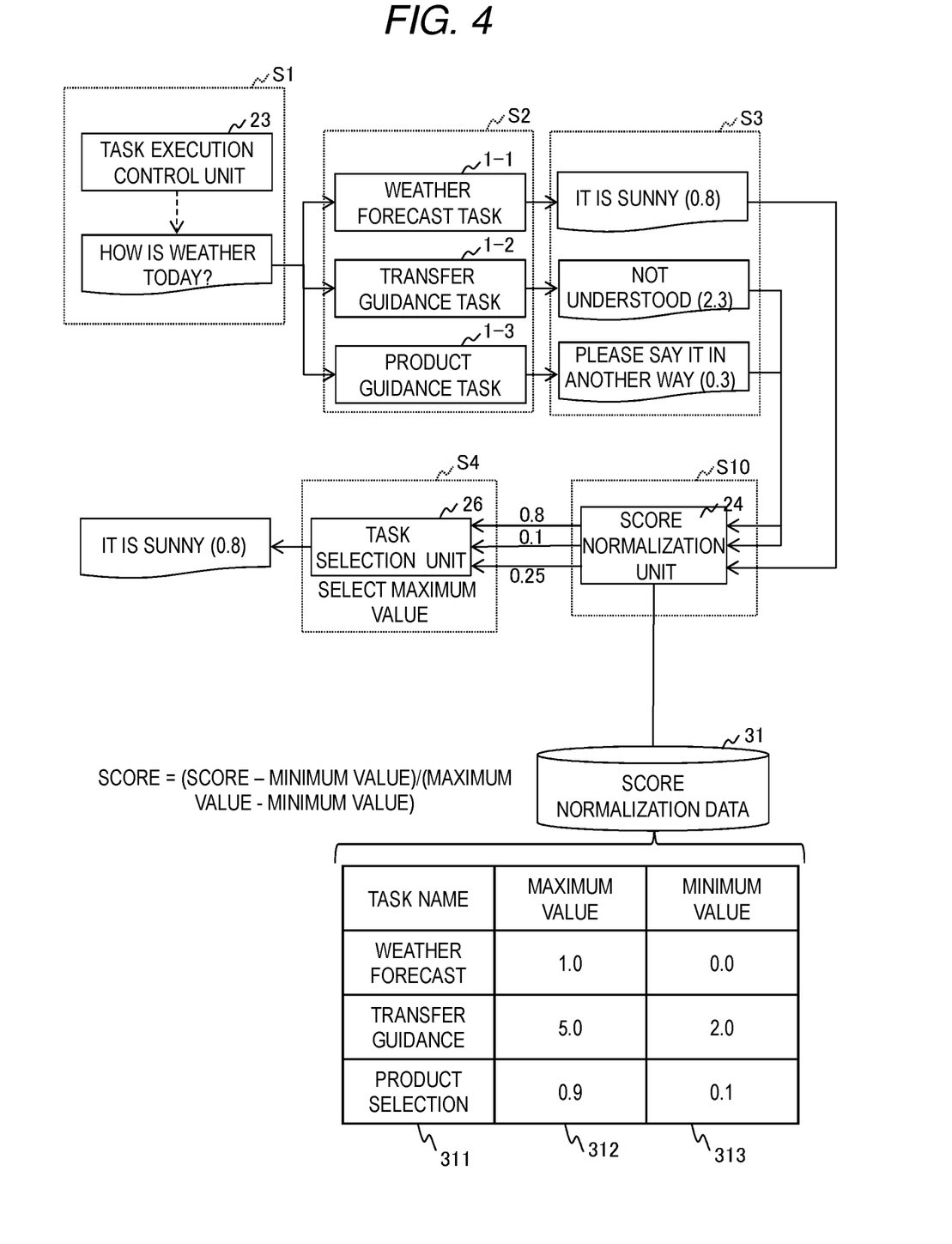
FIG. 4 shows an outline of processing performed by a dialogue system according to a modification of the first embodiment.

FIG. 4 shows an outline of processing performed by a dialogue system according to a modification of the first embodiment of the invention. In FIG. 4, a fact different from that of the example shown in FIG. 2 is that, after scores obtained from the tasks 1 are normalized by the score normalization unit 24 (S10), the normalized scores are input to the task selection unit 26.

When ranges of values of the scores (certainty factors) calculated by the score calculation units 110 of the tasks 1 are different due to different development sources, the score normalization unit 24 normalizes the values of the scores based on the score normalization data 31 and then outputs the normalized values to the task selection unit 26. In FIG. 4, the score normalization unit 240 shows an example in which a minimum value of the scores is 0 and a maximum value thereof is 1, and shows that certainty factor=1 is the most likely.

The score normalization data 31 is a preset table for the tasks 1 provided by the dialogue servers 100. The score normalization data 31 includes, in one entry, a task name 311, a maximum value 312 of the scores calculated by the score calculation units 110, and a minimum value 313 of the scores calculated by the score calculation units 110.

The score normalization unit 24 calculates the normalized scores by the following equation.

$$\text{Normalized Score} = (\text{Score} - \text{Minimum Value})/(\text{Maximum Value} - \text{Minimum Value}) \quad (1)$$

As described above, when the ranges of the values of the scores calculated by the score calculation units 110 of the tasks 1 are different, the score normalization unit 24 normalizes the scores, and inputs the normalized scores to the task selection unit 26 whereby an optimal response is selected from responses of a plurality of tasks 1.

Figure 5:
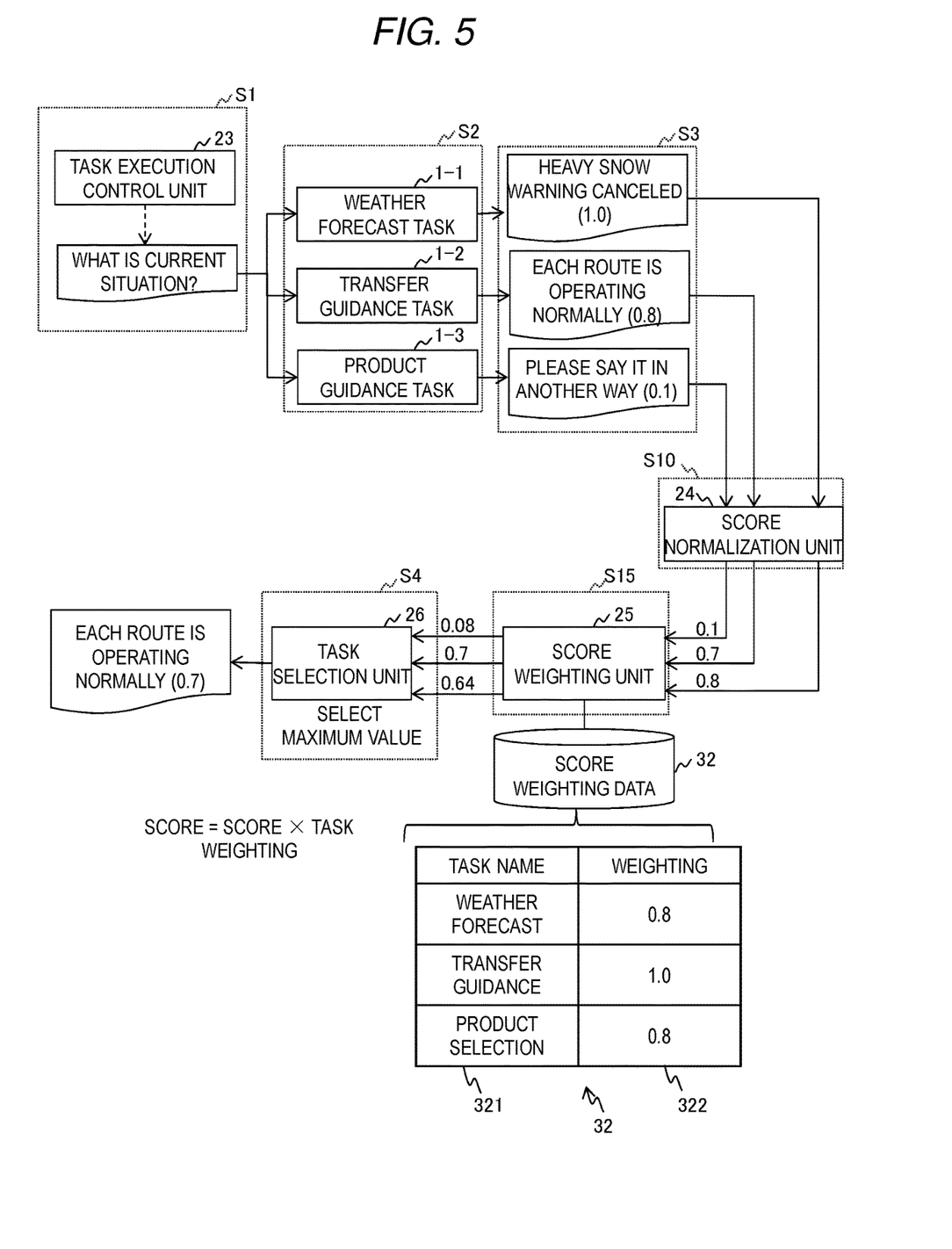
FIG. 5 shows an outline of processing performed by a dialogue system according to a modification of the first embodiment.

FIG. 5 shows an outline of processing performed by a dialogue system according to a modification of the first embodiment of the invention. In FIG. 5, a fact different from that of the modification shown in FIG. 4 is that, after scores obtained from the tasks 1 are normalized by the score normalization unit 24, the score weighting unit 25 weights the normalized scores (S15) and then inputs the weighted scores to the task selection unit 26. Depending on a dialogue service, it may be desirable to place importance on a specific task. For example, in a service that provides a transfer guidance, it is desirable to answer an operation state of a train instead of weather in response to a query of "what is the current situation?" In the present modification, the above is realized by giving priorities to the tasks 1.

When the priorities of the tasks 1 are different, the score weighting unit 25 modifies values of the normalized scores based on the score weighting data 32 and then outputs the modified values to the task selection unit 26.

The score weighting data 32 is a preset table for each task 1 provided by the dialogue server 100. The score weighting data 32 includes, in one entry, a task name 321 and a weighting 322 set for the task.

The score weighting unit 25 calculates the weighted score by the following equation.

$$\text{Weighted Score} = \text{Normalized Score} \times \text{Weighting} \quad (2)$$

As described above, when the priorities of the tasks 1 are different, the score weighting unit 25 modifies the normalized scores in accordance with the weightings and inputs the weighted scores to the task selection unit 26 whereby an optimal response is selected from responses of a plurality of tasks 1.

Figure 6:
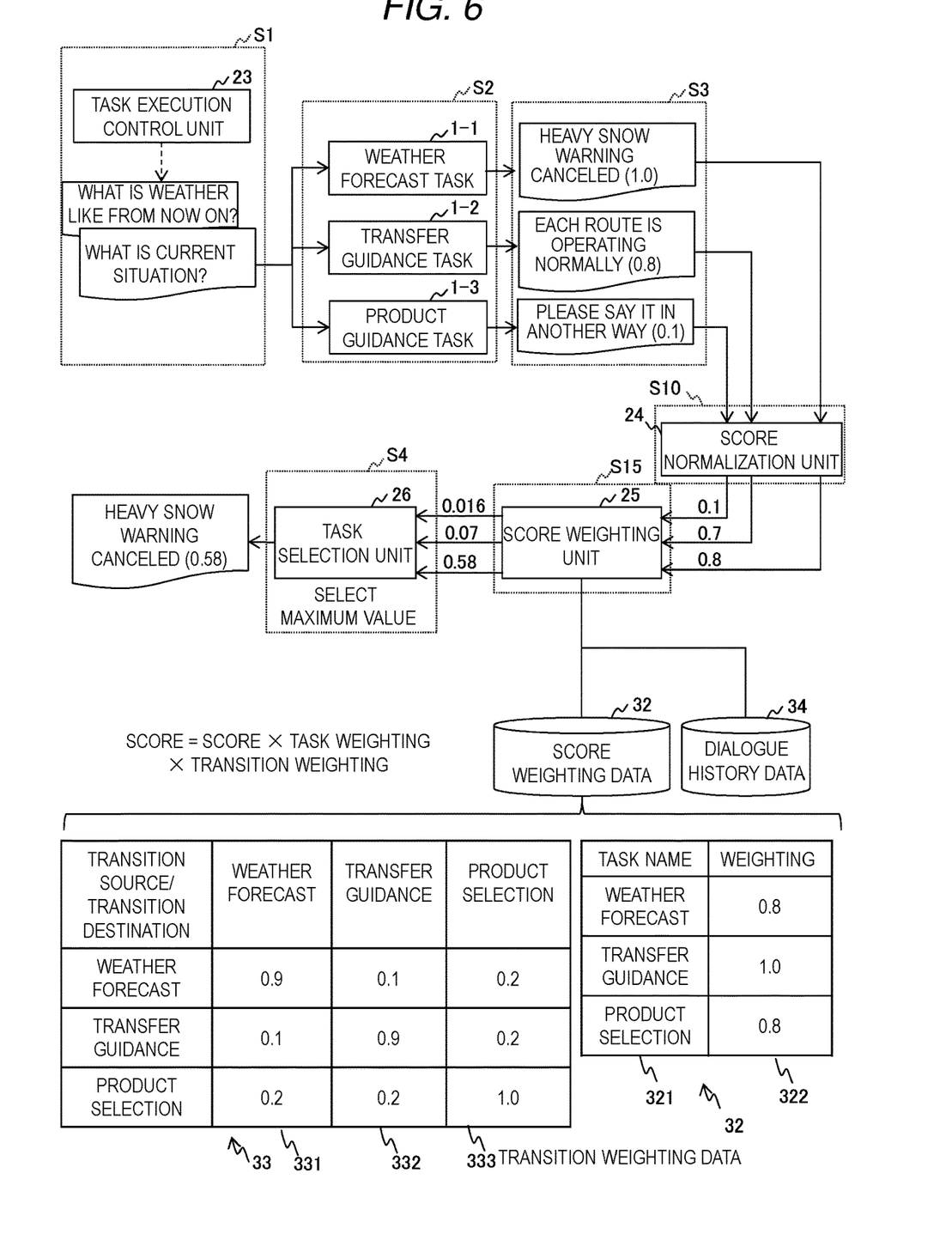
FIG. 6 shows an outline of processing performed by a dialogue system according to a modification of the first embodiment.

FIG. 6 shows an outline of processing performed by a dialogue system according to a modification of the first embodiment in the invention. In FIG. 6, a fact different from that of the modification shown in FIG. 5 is that, after scores obtained from the tasks 1 are normalized by the score normalization unit 24, transition weightings (probabilities) among the tasks 1 are added to weightings of tasks 1 when the normalized scores are weighted by the score weighting unit 25 (S15). In a successive dialogue, the same topic (task) often continues. For example, after today's weather at a location is queried, probability of precipitation at the same location is often queried. In the present modification, the above is realized by giving weightings among the tasks 1.

The score weighting unit 25 includes, in addition to the score weighting data 32, a transition weighting data 33 in which transition weightings among the tasks 1 in a previous dialogue and in a present dialogue are preset, and a dialogue history data 34 in which dialogue history is accumulated.

The transition weighting data 33 includes, in one entry, a weather forecast 331 that stores a probability of transitioning from a previous task 1 to the weather forecast task 1-1, a transfer guidance 332 that stores a probability of transitioning from the previous task 1 to the transfer guidance 1-2, and a product guidance 333 that stores a probability of transitioning from the previous task 1 to the product guidance task 1-3.

The score weighting unit 25 calculates the weighted score by the following equation.

$$\text{Weighted Score} = \text{Normalized Score} \times \text{Weighting} \times \text{Transition Weighting} \quad (3),$$

in which the transition weighting is a probability of the transition weighting data 33.

As described above, when the priorities of the tasks 1 are different and contents of the dialogues transition among the tasks 1, the score weighting unit 25 modifies the normalized scores in accordance with the weightings of the tasks 1 and the transition weightings and inputs the weighted scores to the task selection unit 26 whereby an optimal response is selected from responses of a plurality of tasks 1.

The dialogue history data 34 is used to calculate the transition probabilities among the tasks 1 from the accumulated dialogue history.

Figure 7:
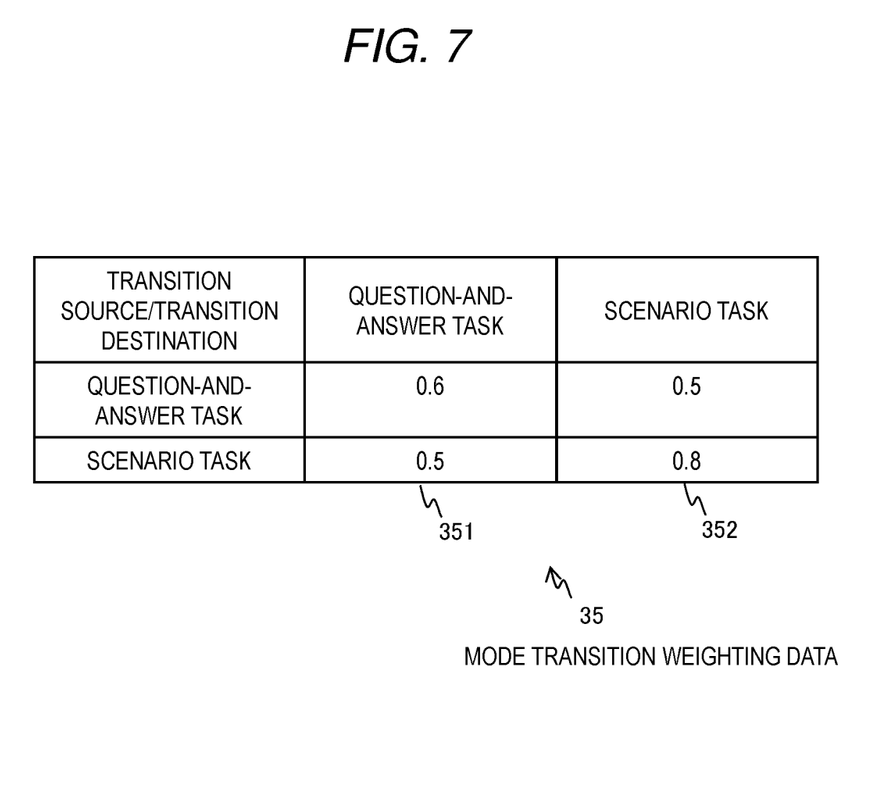
FIG. 7 shows an example of mode transition weighting data according to a modification of the first embodiment.

FIG. 7 shows an outline of processing performed by a dialogue system according to a modification of the first embodiment of the invention. FIG. 7 shows an example in which, instead of the probabilities of transitioning among the tasks 1 shown in FIG. 6, the answer generation unit 27 uses mode transition weighting data 35 in which probabilities of transitioning between a scenario mode and a question-and-answer mode are set.

The mode transition weighting data 35 includes, in one entry, a question-and-answer task 351 that stores a probability of transitioning from a previous mode to the question-and-answer mode, and a scenario task 352 that stores a probability of transitioning from the previous mode to the scenario mode.

As described above, during the switching between the scenario mode and the question-and-answer mode, the answer generation unit 27 inputs weighted scores, in which normalized scores are modified in accordance with transition weightings between modes, to the task selection unit 26 whereby an optimal response is selected from responses of a plurality of tasks 1.

Second Embodiment

Figure 8:
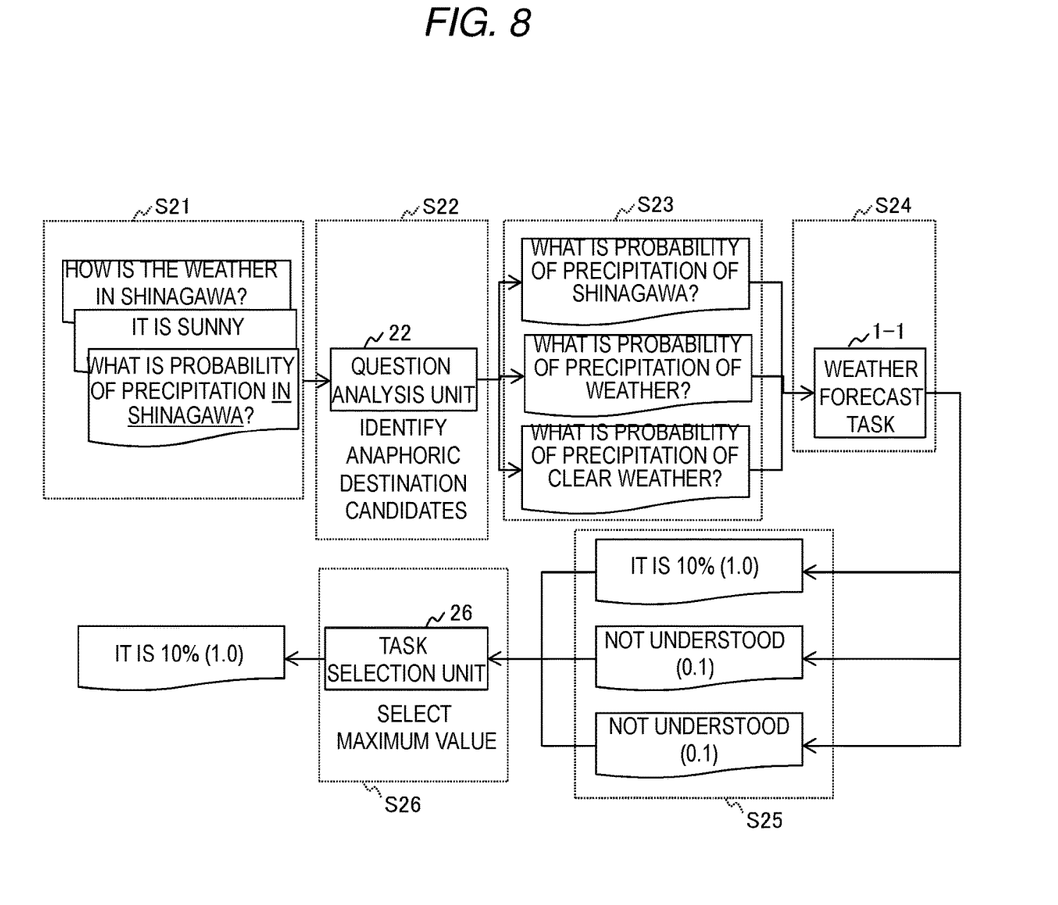
FIG. 8 shows an outline of processing performed by a dialogue system according to a second embodiment.

FIG. 8 shows an outline of processing performed by a dialogue system according to a second embodiment of the invention. The second embodiment shows an example in which one task of the dialogue server 100 is used to perform an anaphoric analysis. A configuration of the dialogue system is the same as that of FIG. 1 according to the first embodiment.

The text input unit 21 receives text, stores the text in the dialogue history data 34 (S21), and inputs the text to the question analysis unit 22. The question analysis unit 22 determines whether an instruction phrase is provided in the text. If the instruction phrase is provided, the question analysis unit 22 obtains past dialogue data from the dialogue history data 34 and extracts a plurality of nouns corresponding to the instruction phase. The question analysis unit 22 generates a plurality of question sentences with the plurality of extracted nouns (S23).

In the shown example, the question analysis unit 22 extracts nouns from past two pieces of dialogue data by using a morphological analysis or the like, assigns the extracted nouns to an instruction phrase of current text, and generates a plurality of question sentences (or input sentences).

Then, the task execution control unit 23 calculates a distributed representation of words included in the text by word2vec or the like, and selects the task 1 corresponding (similar) to a content (context) of the text (S24). In the shown example, the words provided in the text="probability of precipitation" corresponds to weather. Therefore, the weather forecast task 1-1 is selected. The task execution control unit 23 inputs the plurality of generated question sentences to the weather forecast task 1-1 and causes the generated question sentences to be executed (S25).

When receiving responses to all the question sentences and scores (reliabilities), the task execution control unit outputs the responses and the scores to the task selection unit 26. The task selection unit 26 selects a response of "It is 10%" having a highest score (1.0) from a plurality of responses, and outputs the selected response to the answer generation unit 27 as a response to the text including the instruction phrase (S26).

The above describes an example in which the task 1 corresponding to the content of the text is selected, and the plurality of question sentences are input thereto. It should be noted that the plurality of questions may be input to all the tasks 1 in the same manner as in the first embodiment.

As described above, in the second embodiment, it is possible to obtain a result equivalent to execution of the tasks 1 by identifying an anaphoric destination of the instruction phrase included in the text. Instead of performing identification of the instruction phrase before executing the task 1, the task is executed for all possible anaphoric destinations to make a selection thereafter. According to the second embodiment, a dialogue processing of the text including the instruction phrase can be easily realized. When a dialogue flow is determined in accordance with a scenario, the instruction phrase is identified by success/failure of a dialogue whereby identification of an instruction phrase along the dialogue flow can be easily realized.

DETAILED DESCRIPTION OF THE EMBODIMENTS

Although the present disclosure has been described with reference to example embodiments, those skilled in the art will recognize that various changes and modifications may be made in form and detail without departing from the spirit and scope of the claimed subject matter.

For example, the above-described embodiments are described in detail for easy understanding of the invention, and the invention is not necessarily limited to those including all the configurations described above. A part of the configuration in one embodiment can be replaced with the configuration in another embodiment, and the configuration in another embodiment can be added to the configuration in one embodiment. For a part of the configuration in each embodiment, addition, deletion, or replacement of another configuration may be applied alone or in combination.

Some or all of the above-described configurations, functions, processing units, processing methods, and the like may be realized by hardware, for example, by designing an integrated circuit. The above-described components, functions, and the like may also be realized by software by a processor that interprets and executes programs that implement respective functions. Programs for realizing the functions and information such as tables and files can be placed in a recording device such as a memory, a hard disk, and a solid state drive (SSD), or in a recording medium such as an IC card, an SD card, and a DVD.

Control lines and information lines that are considered to be necessary for description are shown, and all the control lines and information lines needed for products are not necessarily shown. In practice, it may be considered that almost all the configurations are connected to each other.

What is claimed is:

1. A dialogue method in which a computer executes a dialogue, the computer including a processor and a memory, the dialogue method comprising:
    a text input step in which the computer receives text;
    a task execution step in which the computer causes the text to be separately executed by a plurality of types of tasks;
    an execution result obtaining step in which the computer separately obtains execution results from the plurality of types of tasks;
    a task selection step in which the computer selects one of the obtained execution results; and
    a response output step in which the computer outputs the selected execution result as an answer to the text,
    wherein in the execution result obtaining step, responses to the text and certainty factors of the responses to the text are obtained,
    wherein in the task selection step, a response having a maximum certainty factor is selected from the responses,
    wherein in the response output step, a scenario mode of generating answers corresponding to the responses based on a preset scenario and a question-and-answer mode of generating answers corresponding to the responses based on the received text are switched and executed, and
    wherein in the task selection step, preset transition probabilities between the scenario mode and the question-and-answer mode are obtained to select a response having a maximum value obtained by multiplying the certainty factors obtained from the plurality of types of tasks by the transition probabilities between the scenario mode and the question-and-answer mode.

2. The dialogue method according to claim 1, further comprising:
    an input sentence generation step of generating a plurality of input sentences obtained by obtaining nouns from past dialogue data and assigning the nouns in an instruction phrase when the instruction phrase is provided in the received text, wherein
    in the task execution step, the plurality of input sentences are executed in the tasks.

3. A dialogue system in which a computer executes a dialogue, the computer including a processor and a memory, the dialogue system comprising:
    a text input unit that receives text;
    a task execution control unit that causes the text to be separately executed by a plurality of types of tasks and obtains separately execution results from the plurality of types of tasks;
    a task selection unit that selects one of the obtained execution results; and
    an answer generation unit that outputs the selected execution result as an answer to the text,
    wherein the task execution control unit obtains responses to the text and certainty factors of the responses to the text,
    wherein the task selection unit selects a response having a maximum certainty factor from the responses,
    wherein the answer generation unit switches and executes a scenario mode of generating answers corresponding to the responses based on a preset scenario and a question-and-answer mode of generating answers corresponding to the responses based on the received text, and
    wherein the task selection unit obtains preset transition probabilities between the scenario mode and the question-and-answer mode and selects a response having a maximum value obtained by multiplying the certainty factors obtained from the plurality of types of tasks by the transition probabilities between the scenario mode and the question-and-answer mode.

4. The dialogue system according to claim 3, further comprising:
    an input sentence generation unit that generates a plurality of input sentences when an instruction phrase is provided in the received text, the instruction phrase being obtained by obtaining nouns from past dialogue data and assigning the nouns in the instruction phrase, wherein
    the task execution control unit causes the plurality of input sentences to be executed in the tasks.

5. A non-transitory computer readable medium storing a program that, upon execution, causes a computer to execute a dialogue, the computer including a processor and a memory, the program comprising:
    a text input step in which text is received;
    a task execution step in which the text is separately executed by a plurality of types of tasks;
    an execution result obtaining step in which execution results are separately obtained from the plurality of types of tasks;
    a task selection step in which one of the obtained execution results is selected; and
    a response output step in which the selected execution result is output as an answer to the text,
    wherein in the execution result obtaining step, responses to the text and certainty factors of the responses to the text are obtained,
    wherein in the task selection step, a response having a maximum certainty factor is selected from the responses,
    wherein in the response output step, a scenario mode of generating answers corresponding to the responses based on a preset scenario and a question-and-answer mode of generating answers corresponding to the responses based on the received text are switched and executed, and wherein in the task selection step, preset transition probabilities between the scenario mode and the question-and-answer mode are obtained to select a response having a maximum value obtained by multiplying the certainty factors obtained from the plurality of types of tasks by the transition probabilities between the scenario mode and the question-and-answer mode.

* * * * *